United States Patent
Stone

(10) Patent No.: US 12,372,169 B2
(45) Date of Patent: Jul. 29, 2025

(54) RETENTION CLAMP

(71) Applicant: PACCAR Inc, Bellevue, WA (US)

(72) Inventor: Montgomery Russell Stone, Valley View, TX (US)

(73) Assignee: PACCAR Inc, Bellevue, WA (US)

( * ) Notice: Subject to any disclaimer, the term of this patent is extended or adjusted under 35 U.S.C. 154(b) by 5 days.

(21) Appl. No.: 18/473,082

(22) Filed: Sep. 22, 2023

(65) Prior Publication Data
US 2025/0102081 A1 Mar. 27, 2025

(51) Int. Cl.
*F16L 3/10* (2006.01)
*F16L 3/23* (2006.01)

(52) U.S. Cl.
CPC ........... *F16L 3/1075* (2013.01); *F16L 3/1066* (2013.01); *F16L 3/23* (2013.01)

(58) Field of Classification Search
CPC ......... F16L 3/1075; F16L 3/1083; F16L 3/13; F16L 3/22; F16L 3/222; F16L 3/221; F16L 3/223; F16L 3/2235; F16L 3/1066; F16L 3/23
See application file for complete search history.

(56) References Cited

U.S. PATENT DOCUMENTS

| | | | |
|---|---|---|---|
| 5,615,852 A * | 4/1997 | Heidorn | H02G 3/26 248/68.1 |
| 5,941,483 A * | 8/1999 | Baginski | F16L 3/237 248/68.1 |
| 7,007,900 B2 * | 3/2006 | Goodwin | H02G 7/053 248/74.1 |
| 7,172,162 B2 * | 2/2007 | Mizukoshi | B60H 1/00557 248/65 |

(Continued)

FOREIGN PATENT DOCUMENTS

WO WO-2011018605 A1 * 2/2011 ............ F16L 3/1075

OTHER PUBLICATIONS

HellermannTyton, "Cable tie mount with pipe/tube holder/ for screw fixation, Ø8.12 mm, black, 500pcs.," Mar. 4, 2024, URL= https://www.hellermanntyton.com/products/cable-tie-mounts/hc2a/133-00993#detailsanchor, retrieved on Mar. 6, 2024. (3 pages).

(Continued)

*Primary Examiner* — Eret C McNichols
(74) *Attorney, Agent, or Firm* — Seed IP Law Group LLP

(57) ABSTRACT

A cable or conduit retention system includes a first clamp with a first body coupleable to a second body by a hinge and a latch. The first body includes a retention clip extending from an edge around a cable or conduit receiving channel in the first body, with the cable or conduit receiving channel and the retention clip having a combined arc angle greater than 180 degrees to retain a cable or conduit in the cable or conduit receiving channel prior to the second body being coupled to the first body during assembly. The first body may also include integral fasteners for engaging holes in a mounting support coupled to a vehicle. A second clamp may include integral fasteners for engaging the first clamp in a stacking arrangement. The second body of the first clamp includes an alignment protrusion for engaging an alignment recess in the second clamp to assist in preventing movement between the clamps in the stacked arrangement.

25 Claims, 4 Drawing Sheets

(56) References Cited

U.S. PATENT DOCUMENTS

| | | | |
|---|---|---|---|
| 7,175,138 B2* | 2/2007 | Low | H02G 3/32 248/74.1 |
| 7,770,850 B2* | 8/2010 | Allmann | F16L 3/237 248/65 |
| 8,672,276 B2* | 3/2014 | Fukumoto | F16L 3/2235 248/316.1 |
| 8,708,289 B2* | 4/2014 | Allenbach | F16L 3/2235 248/68.1 |
| 8,827,214 B2* | 9/2014 | Ogawa | F16L 3/1075 248/74.1 |
| 8,910,912 B2* | 12/2014 | Child | F16L 55/035 248/68.1 |
| 9,080,698 B2* | 7/2015 | Fukumoto | F16L 3/237 |
| 9,297,479 B2* | 3/2016 | Kato | F16L 3/1075 |
| 9,416,896 B1* | 8/2016 | Kato | F16L 3/222 |
| 9,453,593 B2* | 9/2016 | Pearson | F16L 3/1075 |
| 10,302,228 B2* | 5/2019 | Costigan | H02G 3/30 |
| 10,411,452 B2* | 9/2019 | Varale | H02G 3/32 |
| 10,948,107 B2* | 3/2021 | Vaccaro | H02G 3/04 |
| 11,641,095 B2* | 5/2023 | Hüppi-Ziegler et al. | H02G 3/0406 248/68.1 |
| 2007/0128939 A1* | 6/2007 | Low | H02G 3/30 439/607.41 |
| 2007/0215757 A1* | 9/2007 | Yuta | F16L 55/035 248/68.1 |

OTHER PUBLICATIONS

HellermannTyton, "Product Catalogue," Jan. 2020, pp. 1-182. (Relevant p. 70).

* cited by examiner

RETENTION CLAMP

BACKGROUND

Technical Field

The present disclosure relates generally to a clamp, and more particularly, but not exclusively, to a clamp capable of retaining cables, conduits, and other like devices.

Description of the Related Art

Certain clamps are known for use with vehicles, and in particular industrial vehicles and large trucks. For example, clamps are typically used to secure battery cables to the vehicle and prevent movement of the cables during operation of the vehicle. Conventional clamps are a two-part construction with the parts removably coupled to each other. Each part includes channels that cooperate with channels of the other part to define through-going passages for receiving and securing cables when the parts are coupled together. For example, a battery cable clamp may include two such channels in each part to define two through-going passages for securing positive and negative battery cables.

However, cables are prone to fall out of the channels during assembly, which generally makes the clamps more difficult to use and decreases efficiency. This problem is particularly pronounced for battery cables for large industrial vehicles, which are thick and heavy gauge cables. In such a situation, the installer may have difficulty holding and manipulating the cables while also trying to assemble and install the clamp. In addition, the use of more than two battery cables, such as multiple sets of positive and negative battery cables, may be desirable in some applications. Conventional clamps cannot be stacked and are typically installed above or below each other, which increases the space utilized by the clamps. Alternatively, where conventional clamps can be stacked, such arrangement leads to undesirable sliding or rotation of the clamps relative to each other. Further, an installer may experience increased difficulty arranging multiple clamps during assembly for the reasons provided above.

As a result, applicant believes it would be advantageous to have a clamp that overcomes the deficiencies and disadvantages associated with known cable clamps.

BRIEF SUMMARY

The present disclosure generally relates to a cable or conduit retention system. The system may include only one, or two or more clamps. Each clamp may be a clamshell clamp with a first body removably and rotatably coupled to a second body by a hinge, and with a latch to secure the first and second bodies together. The first and second bodies each include cable or conduit receiving channels that cooperate to define cable or conduit retention passages in the clamp when the first body is coupled to the second body. The first body may include at least one retention clip extending from an edge around the cable or conduit receiving channel in the first body. The retention clip and the cable or conduit receiving channel may have a combined arc angle greater than 180 degrees such that the cable or conduit receiving channel and the retention clip engage a cable or conduit in the first cable or conduit receiving channel during assembly and secure it without assistance from the operator. More specifically, the retention clip may be at least partially elastic such that when a cable or conduit is inserted into the cable or conduit receiving channel in the first body, the retention clip flexes or deforms away from the cable or conduit receiving channel to allow the cable or conduit to be inserted, but once the cable or conduit is received in the cable or conduit receiving channel, the retention clip returns to a neutral position and applies a compressive force on the cable or conduit to retain the cable or conduit in the cable or conduit receiving channel without assistance from the operator or from the second body. The second body may then be coupled to the first body to secure the cable or conduit in the retention passage formed by the cable or conduit receiving channels of the first and second bodies.

The first body of each clamp may also include an alignment recess in an outer surface opposite the opening and at least one integral fastener (e.g., push fit fastener) while the second body includes an alignment protrusion that is configured in a complementary manner to the alignment recess and at least one fastener hole (e.g., catch) extending through the second body. The clamps can be stacked on top of each other, with the alignment recess of the first body of a first clamp mating with the alignment protrusion of the second body of a second clamp when the first clamp is stacked on the second clamp, and with the fastener hole in the second body of the first clamp receiving the integral fastener of the first body of the second clamp. The operator can then insert a bolt or other fastener through the stacked clamps to secure the clamps to a vehicle or other support. The integral fastener of the first body of the first clamp can alternatively be inserted into fastener holes in a mounting support coupled to a vehicle to hold the first clamp in place during assembly, or to couple the stacked assembly to the vehicle, rather than being inserted into an adjacent clamp. The alignment recess and alignment protrusion of adjoining clamps interface to prevent sliding and rotation between the clamps while the integral fastener and the fastener hole enable more efficient and effective assembly and installation of multiple clamps. The stacking arrangement between the clamps also saves space. As a result, the concepts of the disclosure enable a user to more efficiently and effectively assemble and install the clamps, while also enabling stacking of clamps in a space saving arrangement and otherwise overcoming the disadvantages of known clamps.

In one or more embodiments, a cable or conduit retention system includes: a clamshell clamp including a first body pivotably coupled to a second body, the first body and the second body selectively coupleable together in a face-to-face arrangement to define one or more cable or conduit receiving passages, the first body including one or more cable or conduit receiving channels and a respective pair of retention clips on opposite sides of each of the one or more cable or conduit receiving channels in the first body, each pair of retention clips being structured to retain a respective cable or conduit in the corresponding cable or conduit receiving channel prior to the second body being coupled to the first body in the face-to-face arrangement to secure the cable or conduit in the clamshell clamp, wherein the first body of the clamshell clamp includes an alignment recess, and a pair of fasteners extending from the first body on opposite sides of the alignment recess, and wherein the second body of the clamshell clamp includes an alignment protrusion, and a pair of fastener holes extending through the second body on opposite sides of the protrusion.

In an embodiment, each pair of retention clips of the first body extend from opposing peripheral edges about a respective one of the one or more cable or conduit receiving channels in the first body.

In an embodiment, each of the retention clips extend around a corresponding one of the cable or conduit receiving channels at an arc angle between and excluding 0 degrees and 20 degrees.

In an embodiment, the cable or conduit retention system further includes: a mounting support structured to be coupled to a vehicle, the mounting support including fastening holes structured to receive the pair of fasteners extending from the first body for securing the clamshell clamp to the mounting structure; and a spring clip nut on the mounting support, and wherein the alignment recess of the first body is structured to accommodate the spring clip nut and enable mounting surfaces on opposing sides of the alignment recess to abut the mounting support.

In an embodiment, the clamshell clamp includes an axial bore through the first body and through the second body and the the cable or conduit retention system further includes a fastener insertable through the axial bore of the clamshell clamp to engage the spring clip nut on the mounting support to securely fasten the clamshell clamp to the vehicle.

In an embodiment, the cable or conduit retention system further includes: a supplemental clamshell clamp including a first body pivotably coupled to a second body and selectively coupleable to the second body in a face-to-face arrangement, the supplemental clamshell clamp including an alignment recess in the first body, a pair of fasteners extending from the first body on opposite sides of the alignment recess, an alignment protrusion extending from the second body, and a pair of fastening holes through the second body on opposite sides of the alignment protrusion.

In an embodiment, the alignment recess in the first body of the supplemental clamshell clamp is structured to receive the alignment protrusion of the second body of the clamshell clamp in a stacking arrangement and the pair of fastening holes of the second body of the clamshell clamp are structured to receive the pair of integral fasteners of the first body of the supplemental clamshell clamp to secure the further clamshell clamp to the clamshell clamp in a stacked arrangement.

In one or more embodiments, a system includes: a clamp including a first body removably coupleable to a second body in a face-to-face arrangement; a receiving passage in the clamp defined at least in part by a receiving channel in the first body; and at least one retention clip extending from the first body at an edge of the receiving channel in the first body, the at least one retention clip extending away from a mating surface of the first body beyond a midplane of the receiving channel to retain a cable or conduit in the receiving channel prior to the second body being coupled to the first body in the face-to-face arrangement to secure the cable or conduit in the receiving passage.

In an embodiment, the at least one retention clip includes a pair of retention clips extending from the first body on opposing edges of the receiving channel, and wherein the receiving channel in the first body defines a first arc angle about the receiving passage and the pair of retention clips collectively define a second arc angle about the cable receiving passage, and a sum of the first arc angle and the second arc angle is greater than 180 degrees.

In an embodiment, the sum of the first arc angle and the second arc angle is between about 190 degrees and about 230 degrees.

In an embodiment, the pair of retention clips are resilient and are configured to flex away from each other during insertion of the cable or conduit into the receiving channel and to return to a neutral position to assist in retaining the cable or conduit in the receiving channel.

In an embodiment, the second body further includes an opposing receiving channel, and wherein the receiving passage is collectively defined by the receiving channel in the first body and the opposing receiving channel in the second body when the first body is coupled to the second body in the face-to-face arrangement.

In an embodiment, the second body includes a depression at an edge of the opposing receiving channel of the second body, the depression in the second body structured to receive the at least one retention clip when the first body is coupled to the second body in the face-to-face arrangement.

In an embodiment, the system further includes: a mounting support structured to be coupled to a vehicle; and a spring clip nut on the mounting support, the first body including an alignment recess structured to receive the spring clip nut when the first body is adjacent to the mounting support.

In an embodiment, the first body of the clamp includes a fastener extending from the first body, the second body includes an alignment protrusion extending from the second body and a hole through the second body, and the system further includes: a supplemental clamp including a first body, a second body removably coupleable to the first body in a face-to-face arrangement, an alignment recess in the first body, and a fastener extending from the first body.

In an embodiment, the alignment recess in the first body of the supplemental clamp is structured to receive the alignment protrusion of the second body of the clamp in a stacking arrangement and the hole through the second body of the clamp is structured to receive the fastener of the first body of the supplemental clamp to couple the second clamp to the first clamp.

In an embodiment, the clamp in one of a plurality of clamps that are coupleable together in a stacked configuration.

In an embodiment, each clamp is identical to each other.

In an embodiment, each clamp comprises a similar form factor and includes one or more receiving passages having a size corresponding to standard electrical cables or standard fluid conduits.

In one or more embodiments, a clamp system includes: a clamp, including a first clamp portion having a cable or conduit receiving channel, and an alignment recess and a fastener opposite the cable or conduit receiving channel, a second clamp portion selectively coupleable to the first clamp portion in a face-to-face arrangement, the second clamp portion including an alignment protrusion and a fastening hole through the second clamp portion, and a cable or conduit receiving passage defined at least in part by the cable or conduit receiving channel in the first clamp portion and the second clamp portion when in the face-to-face arrangement, the first clamp portion structured to retain a cable or conduit in the cable or conduit receiving channel prior to the second clamp portion being coupled to the first clamp portion in the face-to-face arrangement to secure the first cable or conduit in the cable or conduit receiving passage.

In an embodiment, the first clamp portion includes a pair of retention clips proximate the cable or conduit receiving channel in the first clamp portion, a combined arc angle of the pair of retention clips and the cable or conduit receiving channel in the first clamp portion being greater than 180 degrees to retain the cable or conduit in the cable or conduit receiving channel prior to the second body being coupled to the first body in the face-to-face arrangement.

In an embodiment, the clamp system further includes: a supplemental clamp structured to be coupled to the first clamp in a stacked configuration and including a first clamp portion selectively coupleable to a second clamp portion in a face-to-face arrangement, the supplemental clamp further including an alignment recess in the first clamp portion, and a fastener extending from the first clamp portion.

In an embodiment, the alignment recess of the first clamp portion of the supplemental clamp is structured to receive the alignment protrusion of the second clamp portion of the clamp and the fastening hole of the second clamp portion of the clamp is structured to receive the fastener of the first clamp portion of the supplemental clamp to couple the second clamp to the first clamp in the stacked configuration.

In an embodiment, the clamp includes a fastener extending from a lower mating surface of the first clamp portion, and the clamp system further includes a mounting support structured to be coupled to a vehicle, the mounting support including at least one hole structured to receive the fastener of the first clamp portion of the clamp to couple the clamp to the vehicle.

In an embodiment, the first clamp portion includes a plurality of cable or conduit receiving channels and at least one respective retention clip proximate each of the plurality of cable or conduit receiving channels to retain a plurality of cables or conduits within the first clamp portion prior to the second clamp portion being coupled to the first clamp portion in the face-to-face arrangement.

Additional benefits and advantages of the concepts of the disclosure will be described in detail with reference to the accompanying drawings, or otherwise appreciated by those of ordinary skill in the relevant art upon a review of the present disclosure.

DETAILED DESCRIPTION

Figure 1:
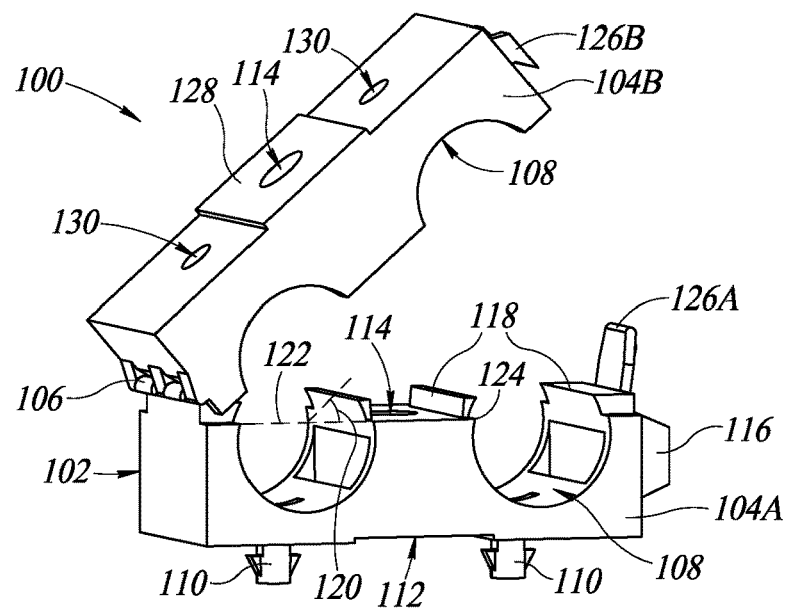
FIG. 1 is an isometric view of an embodiment of a clamp system with a first clamp in an open position according to the present disclosure.

Persons of ordinary skill in the relevant art will understand that the present disclosure is illustrative only and not in any way limiting. Other embodiments of the presently disclosed systems and methods readily suggest themselves to such skilled persons having the assistance of this disclosure.

Each of the features and teachings disclosed herein (including as set forth in the dependent claims) can be utilized separately or in conjunction with other features and teachings to provide embodiments of the technology. Representative examples utilizing many of these additional features and teachings, both separately and in combination, are described in further detail with reference to attached FIGS. 1 through 7. This detailed description is merely intended to teach a person of skill in the art further details for practicing aspects of the present teachings and is not intended to limit the scope of the claims. Therefore, combinations of features disclosed in the detailed description may not be necessary to practice the teachings in the broadest sense, and are instead taught merely to describe particularly representative examples of the present technology.

Moreover, the various features of the representative examples and the dependent claims may be combined in ways that are not specifically and explicitly enumerated in order to provide additional useful embodiments of the disclosure. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced, but are not intended to limit the dimensions and the shapes shown in the examples in some embodiments. In some embodiments, the dimensions and the shapes of the components shown in the figures are exactly to scale and intended to limit the dimensions and the shapes of the components. Except as otherwise indicated, like reference numerals in the figures refer to like parts in the various views.

As used herein, the term "user" may refer to any human operator of a device or system described in the present disclosure. Further, the words "vertical," "vertically," "horizontal," and "horizontally" are approximations rather than exact descriptors of orientations, and generally refer to orientations as seen by an observer at a point in space at a distance from the described features rather than actual physical orientations. For example, a line that is curved or bowed in space may be vertical or horizontal as viewed by an observer at a certain point in space at a distance from the line. As used herein, the phrases "front," "back," "up," "down," "above," and "below," and other similar terminology, take their common meaning. The term "vehicle" is to be construed broadly to include any internal combustion, electric, or alternative energy source (fuel cell, biodiesel, etc.) driven device drivable or ridable on land or water and expressly includes all manners and types of cars, trucks, boats, industrial vehicles, utility vehicles, commercial vehicles, all-terrain vehicles, personal watercraft, dirt bikes, scooters, bicycles, and others now know or developed in the future.

FIG. 1 is an isometric view of one or more embodiments of a clamp system 100. In particular, FIG. 1 illustrates a first clamp 102 of the system 100 provided in a form factor of a clamshell clamp. The first clamp 102 is illustrated on its side in FIG. 1 to more clearly show the features of the first clamp 102, meaning that the top of the first clamp 102 in the orientation of FIG. 1 is a front surface in some applications and the bottom of the first clamp 102 in the orientation of FIG. 1 is a rear surface. The orientation of the first clamp 102 in a preferable operational application is shown in subsequent FIGS. 2 through 5 and directional indicators (i.e., front, rear, top, bottom, etc.) described with reference to FIG. 1 generally refer to the orientation of the first clamp 102 in FIG. 2 unless otherwise indicated. However, it should be appreciated that the first clamp 102 can be assembled and installed in any orientation and thus the directional indicators may be provided solely to assist in understanding the concepts of the disclosure rather than to limit the scope of the disclosure and claimed embodiments.

As used herein, a "clamshell clamp" refers to any clamp that includes two parts removably and rotatably coupled to each other. Thus, the first clamp 102 may also be referred to herein as a first clamshell clamp 102 in some embodiments.

Although the present disclosure will proceed to describe non-limiting examples of clamps provided in a form factor of a clamshell clamp, it is to be appreciated that the concepts of the disclosure can be applied equally to any type of clamp in any form factor, and in particular, but not exclusively, to any type of clamp structured to receive and secure one or more cables or conduits. Thus, embodiments of the disclosure likewise include other types of clamps and clips, such as clamps with two separate parts that do not rotate relative to each other, but rather, are coupleable to each other to retain one or more cables, as well as clamps or clips that only include a single part or body for retaining a cable or conduit, among other possibilities.

The first clamp 102 includes a first body 104A rotatably or pivotably coupled to a second body 104B by a hinge 106. The first body 104A and the second body 104B may also be referred to herein as first and second clamp portions 104A, 104B, respectively. The first clamp 102 is illustrated in FIG. 1 in at least a partially open position, meaning that the second body 104B is rotated away from the first body 104A via the hinge 106 and is therefore spaced from the first body 104A. The hinge 106 may enable rotation of the first and second bodies 104A, 104B relative to each other by up to 180 degrees or more in some embodiments, as more clearly shown in FIG. 2. Further, the first body 104A and the second body 104B may be selectively coupleable together with inner mating surfaces in a face-to-face arrangement in a closed position, as described in more detail below.

Continuing with FIG. 1, the first body 104A includes at least one cable or conduit receiving channel 108 (which may also be referred to herein as at least one cable or conduit receiving cavity 108, or more generally as at least one receiving channel 108 or at least one receiving cavity 108) in a front or first surface of the first body 104A that cooperates with a similar cable or conduit receiving channel 108 in a rear or second surface of the second body 104B when the second body 104B is coupled to the first body 104A in a face-to-face arrangement in the closed position to define a cable or conduit retention or receiving passage (which may also be referred to herein as a receiving passage). The cable or conduit receiving passage may have various shapes and sizes to receive industry standard sizes of cables, cords, conduits, and the like. For example, the cable or conduit receiving passage may have a diameter and/or circumference in the closed position of the first clamp 102 corresponding to commercially available battery cables, other electrical cables, hydraulic fluid conduits, and other fluid conduits. Each of the receiving channels 108 may generally be semicircular in shape and in some examples, have an arc angle between 170 degrees and 190 degrees, and more preferably approximately 180 degrees such that when the receiving channels 108 of the first and second bodies 104A, 104B combine to define the cable or conduit receiving passage, the receiving passage is a circle with a selected size and shape corresponding to a cable or conduit received in the clamp 102. In some embodiments, the first and second bodies 104A, 104B may include more than one cable or conduit receiving channel 108, such as two cable or conduit receiving channels 108 to define two cable or conduit receiving passages for positive and negative battery cables, hydraulic fluid conduits, and other cables or conduits, as in FIG. 1. Of course, more or less than two channels 108 may be selected for inclusion in the first and second bodies 104A, 104B.

In some embodiments, the first body 104A further includes at least one integral fastener 110 (e.g., push fit fastener) extending from a rear or lower mating surface of the first body 104A opposite the cable or conduit receiving channel 108. The integral fastener 110 may be provided in a form factor of a push fit fastener with a protrusion with flanges extending outward from the protrusion to engage a corresponding hole or catch, as described in more detail herein. As shown in FIG. 1, the first body 104A may include two integral fasteners 110 spaced on opposite sides of an alignment recess 112 in the rear surface of the first body 104A. The position of the integral fasteners 110 relative to the alignment recess 112 may be selected, such as an equidistant or irregular spacing from boundaries of the alignment recess 112. A bore 114 extends through the first body 104A from the top surface to the bottom surface and is structured to receive a fastener, as described below.

Figure 2:
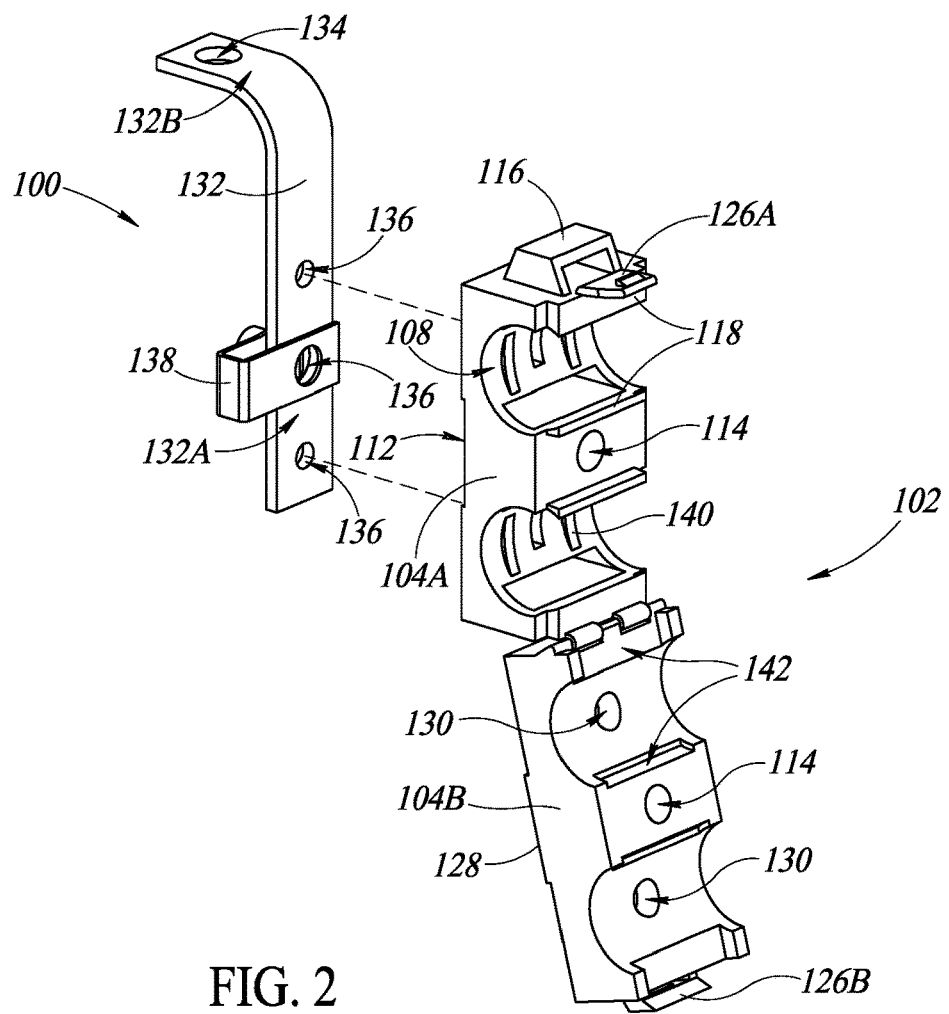
FIG. 2 is an exploded view of the first clamp and an embodiment of a mounting support of the clamp system of FIG. 1.

A supplemental support 116 extends from a top surface of the first clamp 102 and is structured to receive a fastener, a flexible filament, or a zip tie to attach the first clamp 102 to an external device. In an embodiment, the supplemental support 116 enables the first clamp 102 to support additional cable or conduits or a wiring harness, such as by fastening, tying, or otherwise securing the cable or conduits or wiring harness to the first clamp 102 via the supplemental support 116. As best shown in FIG. 2, the supplemental support 116 may generally have an inverted U-shape extending from the top of the first clamp 102 to define an aperture for receiving the fastener, flexible filament, zip tie, or other like device.

Continuing with FIG. 1, the first body 102 also includes one or more retention clips 118, which may also be referred to herein as cable or conduit clips 118. The retention clips 118 extend into the cable or conduit receiving channel 108 in the first body 104A and extend the arc angle of the cable or conduit receiving channel 108 to retain a cable or conduit in the open position of the first clamp 102 without assistance from a user. In other words, the retention clips 118 have an arc angle that, in combination with the arc angle of the cable or conduit receiving channel 108, is greater than 180 degrees. In some embodiments, the arc angle of the retention clips 118 is less than the arc angle of the cable or conduit receiving channel 108, although the same is not necessarily required. Further, the arc angle of each of the cable or conduit receiving channel 108 and the retention clips 118 can be selected and may vary from the non-limiting examples provided herein.

For example, the arc angle of the cable or conduit receiving channel 108 may be 180 degrees or approximately 180 degrees while the arc angle of the retention clips may be 5 degrees to 70 degrees inclusive of all intervening values, and more preferably between about 5 degrees and about 25 degrees so that the retention clips 118 do not block the cable or conduit receiving channel 108 or inhibit entry of the cable or conduit into the cable or conduit receiving channel 108, but provide a sufficient force on the cable or conduit to retain the cable or conduit in the cable or conduit receiving channel 108 without external force or manipulation from the user. As a result, and with reference to FIG. 1, the retention clips 118 may extend at an arc angle 120 from a plane 122 through opposing peripheral edges 124 defining boundaries of the channels 108 that is between and excluding 0 degrees and 90 degrees, inclusive of all intervening values. In preferred embodiments, the angle 120 is between and excluding 0 degrees and 20 degrees, or between about 5 degrees and about 25 degrees and corresponds to the arc angle of the retention clips 118, as above. Where the first body 104A includes only a single retention clip 118 associated with each receiving channel 108, a sum of the arc angle of the receiving channel 108 and the retention clip 118 is greater than 180 degrees, and more preferably is between about 185 degrees and 205 degrees. Where the first body 104A includes retention clips 118 on both opposing sides of each receiving channel 108, the sum of the arc angle of the receiving channel 108 and the retention clips 118 remains greater than 180 degrees, and may be more preferably between about 190 degrees and 230 degrees.

The plane 122 may also correspond to a midplane of the cable or conduit receiving passage, with at least one of, or all of, the retention clips 18 extending away from a mating surface of the first body 104A (e.g., the top surface of the first body 104A in the orientation of FIG. 1) beyond the midplane 122 of the cable or conduit receiving passage in some embodiments. While the above disclosure generally describes an arc angle greater than 180 degrees to assist in retaining a cable in the receiving channels 108, arc angles less than 180 degrees are also contemplated herein, such as with a pinch or snap fit of cables or conduits into the receiving channels 108, or where the retention clips 118 have properties that are selected to enable retaining cables or conduits in the receiving channels 108 despite having a combined arc angle less than 180 degrees.

The retention clips 118 may be positioned at the opposing peripheral edges 124 of the first body 104A that define boundaries of the channels 108 so as to provide a continuous arc angle from the cable or conduit receiving channel 108 to the retention clip 118. Further, and as shown in FIG. 1, the inner retention clips 118, meaning the clips 118 toward a center of the first body 104A, have a smaller width or thickness than the outer retention clips 118 furthest from the center of the first body 104A. The channels 108 may be spaced equidistant from a center of the first body 104A and have the same arc angle. The outer retention clips 118 extend from the cable or conduit receiving channel 108 to an outer surface of the first body 104A, while the inner retention clips 118 do not extend from the peripheral edge 124 to the center of the first body 104A, but rather, terminate at a location that is less than a majority of the distance from the peripheral edge 124 to the center of the first body 104A. As a result, the outer retention clips 118 may have a thickness or width that is at least twice, at least three times, or at least four times greater than the inner retention clips 118, although the same is not necessarily required. The size and shape of the retention clips 118 can be selected to be different from that shown in FIG. 1 and the retention clips 118 may each have the same or different sizes.

The retention clips 118 may be formed from a plastic, rubber, or thermoplastic material, among many materials such that they have some elasticity, resiliency, and/or ability to flex or deform and return to a neutral position. In particular, the inner retention clips 118 can be flexed more easily than the outer retention clips 118 due to the difference in thickness. Thus, when a cable or conduit is inserted into the cable or conduit receiving channel 108, at least the inner retention clips 118 may rotate or flex away from the cable or conduit receiving channel 108 to provide access to the cable or conduit receiving channel 108 and allow the cable or conduit to be received in the channel 108, and then once the cable or conduit 108 is received in the cable or conduit receiving channel 108, rotate or flex back towards the cable or conduit receiving channel 108 (e.g., return to a neutral position) to provide a compressive force against the cable or conduit to assist in retaining the cable or conduit in the cable or conduit receiving channel 108 or in the receiving passage generally. In this way, the retention clips 118 retain a cable or conduit in the cable or conduit receiving channel 108 in the first body 104A without assistance from a user.

In FIG. 1, the first body 104A includes four retention clips 108 with one clip on opposing peripheral edges 124 of each cable or conduit receiving channel 108. However, the first body 104A may include only one, only two, only three or more than four retention clips 118. In a non-limiting example, the first body 104A of the clamp 102 may include only a single retention clip 118 on one peripheral edge 124 of each receiving channel 108, such as only the inner or outer retention clips 118 described above. All of the retention clips 118 may each have the same height and thickness relative to the first body 104A and the same arc angle relative to each other, or may have different dimensions and spacing relative to the first body 104A, as well as different arc angles from each other. In a non-limiting example, the retention clips 118 may be spaced from the peripheral edge 124 defining the channels 108 and may still be able to achieve the benefits described above depending on the dimensions and arc angles of the retention clips 118.

The second body 104B is removably coupled to the first body by a latch 126 that includes a deflectable arm 126A on the first body 104A that is received in, and engages, a receptacle 126B on the second body 104B. The second body 104B also includes an alignment protrusion 128 extending from a front surface of the second body 104B opposite to channels 108 of the second body 104B that has a size and shape to be received in the alignment recess 112 in the first body 104A of a second clamp, as described below. Further, the second body 104B likewise includes a bore 114 through the second body 104B from the front surface to the rear surface of the second body 104B that contains the channels 108. As a result, the bore 114 extends through an entirety of the first clamp 102 to assist with coupling the first clamp 102 to an external structure or support surface, as described herein. In an embodiment, the bore 114 extends through a center of the alignment protrusion 128 and a center of the alignment recess 112, although other configurations are contemplated herein and the location of the bore 114 can be selected. The second body 104B further includes holes 130 (e.g., catches 130) on opposite sides of the alignment protrusion 128 structured to receive the integral fasteners 110 of a second or supplemental clamp.

FIG. 2 is an exploded view of the clamp system 100. In particular, FIG. 2 illustrates the first clamp 102 and a mounting support 132, which may also be referred to herein as a bracket 132. The mounting support 132 includes a first portion 132A and a second portion 132B integral with the first portion 132A as a single, unitary component. The first and second portions 132A, 132B may generally be perpendicular to each other to provide the mounting support with a "J" or "L" or an inverted "J" or inverted "L" shape depending on the frame of reference. The second portion 132B is structured to be coupled to a vehicle, such as a frame or a chassis of the vehicle, with a fastener inserted through a mounting hole 134 in the second portion 132B. The first portion 132A includes a number of fastening holes 136, such as one, two, three, four, or more fastening holes 136.

A spring clip nut 138 is coupled to, and disposed on, the mounting support 132. The spring clip nut 138 includes threads for engaging a fastener inserted through the bore 114 in the first clamp 102. Further, the spring clip nut 138 aligns with one of the fastening holes 136, such as a central fastening hole 136 of the mounting support 132. Outer fastening holes 136 receive the integral fasteners 110 (FIG. 1) of the first body 104A to couple the first clamp 102 to the mounting support 132 and the vehicle. The integral fasteners 110 (FIG. 1) of the first body 104A of the first clamp 102 can be inserted into corresponding fastening holes 136 of the mounting support 132 to couple the first clamp 102 to the mounting support 132 and the vehicle 132 without a separate fastener, or to hold the first clamp 102 in place while the user installs a fastener through the bore 114. In an embodiment, the alignment recess 112 in the rear or mating surface of the first body 104A (or a surface facing the mounting support 132) has a size and a shape to receive the spring clip nut 138 such that the rear or mating surface of the first body 104A is mounted adjacent to, or flush, with the major or mating surface of the mounting support 132. In other words, the alignment recess 112 is structured to accommodate the spring clip nut 138 and enable mounting surfaces on opposing sides of the alignment recess 112 to but the mounting support 132.

Turning to the first clamp 102 shown in FIG. 2, one or both of the first body 104A and the second body 104B may include ridges 140 extending from the bodies 104A, 104B into the channels 108 (i.e., the ridges 140 are located on sidewalls of the bodies 104A, 104B defining the channels 108, such as at the bottom or top of the channels 108) to further assist with engaging and retaining a cable or conduit in the cable or conduit retention passage. In particular, the ridges 140 may prevent sliding of the cable or conduit 220 relative to the clamp 202. Further, the second body 104B may include depressions 142 in the rear surface of the second body 104B (or a surface facing the first body 104A when the second body 104B is coupled to the first body 104A by the latch 126) that correspond in size and shape to the retention clips 118. As a result, the depressions 142 receive the retention clips 118 when the second body 104B is coupled to the first body 104A to enable the channels 108 in the first and second bodies 104A, 104B to form the cable or conduit retention passages in the shape of a circle. The remaining reference numbers for the first clamp 102 provided in FIG. 2 are for reference and to aid in understanding the description above with respect to FIG. 1.

Figure 3:
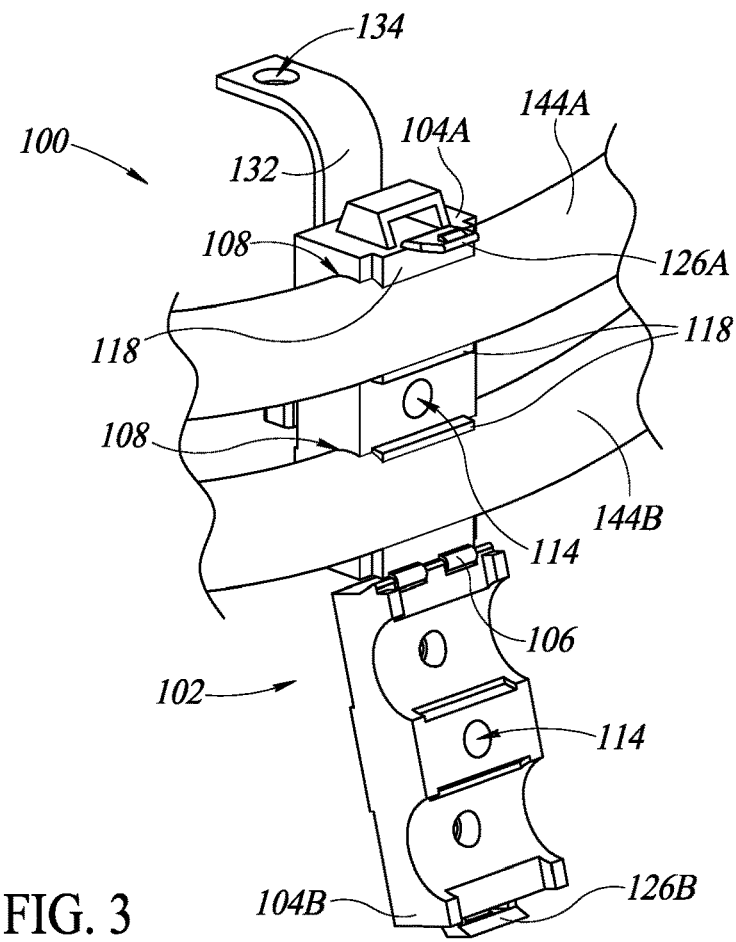
FIGS. 3 through 5 are perspective detail views of steps in an embodiment of an installation process of the clamp system of FIG. 1.
Figure 4:
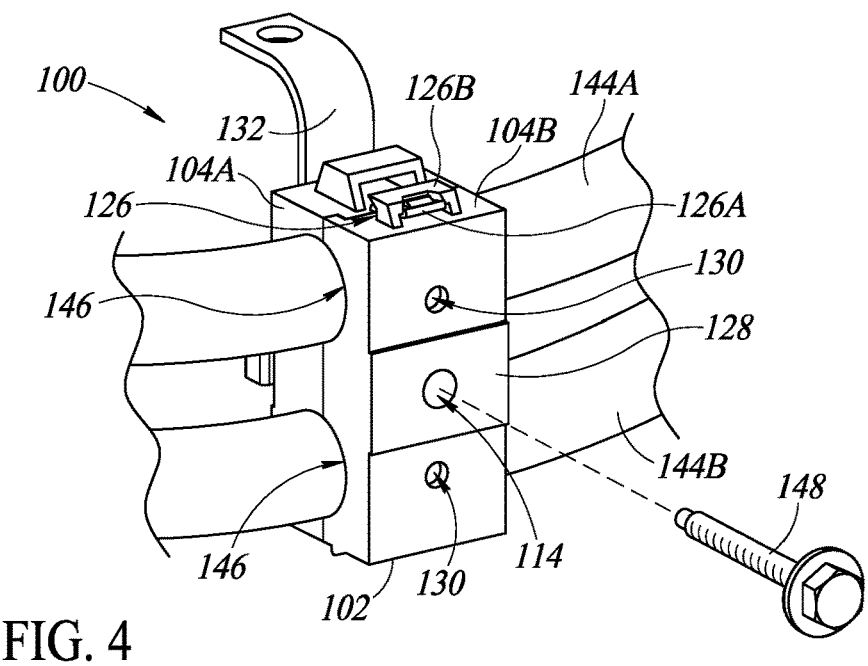
Figure 5:
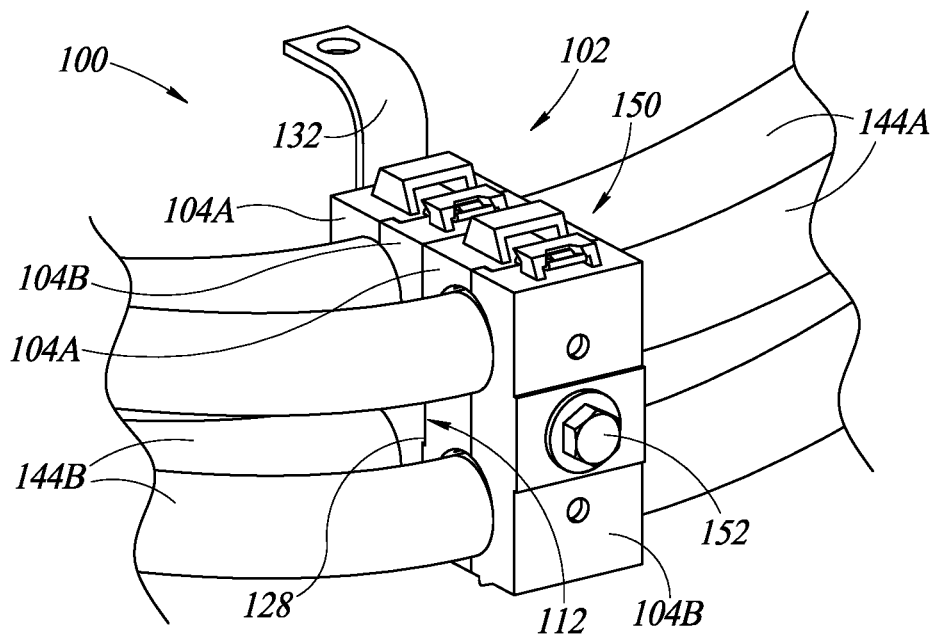

FIGS. 3 through 5 are detail views of steps in an embodiment of an installation process of the clamp system 100. Beginning with FIG. 3, and with continuing reference to FIG. 1 and FIG. 2, the mounting support 132 is coupled to a support of a vehicle with a fastener through mounting hole 134. In other instances, the mounting support may be welded to a frame of a vehicle. In some embodiments, the mounting support 132 is coupled to the support of the vehicle first before the first clamp 102 is coupled to the mounting support 132, or the first clamp 102 may be coupled to the mounting support 132 first according to the process below, followed by the mounting support 132 being coupled to the support of the vehicle. The first clamp 102 is manipulated to the open position shown in FIG. 3 by removing the arm 126A from the receptacle 126B of the latch 126 and rotating the first body 104A away from the second body 104B via the hinge 106 to provide access to one or more channels 108 in the first and second bodies 104A, 104B. Then, the integral fasteners 110 (FIG. 1) of the first clamp 102 are inserted into the fastening holes 136 (FIG. 2) in the mating surface of the mounting support 132 to couple the first clamp 102 to the mounting support 132.

First and second cables or conduits 144A, 144B, which may be positive and negative battery cables, conduits, such as inlet and outlet hydraulic conduits, or others, are inserted into the channels 108 in the first body 104A according to the process described above, namely, the retention clips 118 are rotated or flexed away from the channels 108 in the first body 104A via force form the user urging the cables or conduits 144A, 144B towards, and into the channels 108 in the first body 104A. The cables or conduits 144A, 144B are received in the channels 108 in the first body 104A and the retention clips 118, and in particular at least the inner retention clips 118, have elastic and/or resilient properties such that they rotate or flex back to a neutral position toward the channels 108 in the first body 104A after insertion of the cables or conduits 144A, 144B and apply a compressive force on the cables or conduits 144A, 144B to retain, or assist in retaining, the cables or conduits 144A, 144B in the channels 108 in the first body 104A in the open position of the first clamp 102 shown in FIG. 3. Thus, in FIG. 3, the cables or conduits 144A, 144B are held in place in the channels 108 in the first body 104A in the open position of the first clamp 102 without assistance or external force from the user.

With reference to FIG. 4, the first clamp 102 is manipulated to a closed position shown in FIG. 4 by rotating the second body 104B toward the first body 104A via the hinge 106 (FIG. 3). The second body 104B is coupled to the first body 104A by inserting the arm 126A of the latch 126 into the receptacle 126B of the latch 126. In this closed position of the first clamp 102, the channels 108 in the bodies 104A, 104B define cable or conduit retention passages 146 with the cables or conduits 144A, 144B received and secured in respective retention passages 146. Then, a fastener 148 may be inserted into bore 114 through the first and second bodies 104A, 104B. The fastener 148 engages the threads of the spring clip nut 138 (FIG. 2) and extends through one of the fastening holes 136 (FIG. 2) of the mounting support 132 to couple the first clamp 102 to the mounting support 132 and the vehicle and further secure the cables or conduits 144A, 144B. In some embodiments where the system 100 includes only one clamp 102, the assembly and installation process may be complete as shown in FIG. 4. The system 100 can then be unassembled and reassembled by reversing and repeating the above steps as needed for maintenance or other applications.

In one or more embodiments, the system 100 also includes a second or supplemental clamp 150 shown in FIG. 5 that is coupleable to the first clamp 102 in a stacking arrangement to enable the system 100 to carry and secure additional cables or conduits 144A, 144B. In particular, after the first clamp 102 is installed according to the process in FIG. 3 and FIG. 4, the second clamp 150, which may be identical to the first clamp 102, is coupled to the first clamp 102. Additional cables or conduits 144A, 144B are inserted into the second clamp 150 according to the process described herein. Then, the integral fasteners 110 (FIG. 1) of the second clamp 150 are inserted into the holes 130 (FIG. 4) in an outward or exterior surface of the second body 104B of the first clamp 102 to couple the second clamp 150 to the first clamp 102. The second clamp 150 can be coupled to the first clamp 102 before or after the cable or conduits 144A, 144B are inserted into the second clamp 150.

Then, a fastener 152 is inserted through the bore 114 in each clamp 102, 150 to couple the clamps 102, 150 to the mounting support 132 and the vehicle. In an embodiment, the fastener 152 is longer than fastener 148 to account for the second clamp 150. Thus, the clamps 102, 150 may carry four cable or conduits including two first cable or conduits 144A and two second cable or conduits 144B in a stacking arrangement that saves space and increases organization. Further, in the stacked arrangement of the clamps 102, 150, the alignment protrusion 128 (FIG. 4) on the outward or external mating surface of the second body 104B of the first clamp 102 is received in, and interfaces with, the alignment recess 112 on the rear mating surface of the first body 104A of the second clamp 150 to prevent sliding, rotation, and other movement of the second clamp 150 relative to the first clamp 102. Additional clamps may also be stacked on the combination of the first and second clamps 102, 150 via the same process. The system 100 may also include additional supplemental clamps that are the same as, or similar to, clamps 102, 150. In sum, the system 100 may include a plurality of clamps that are coupleable together in a stacked configuration with each clamp being identical to each other, or with each clamp having a similar form factor including one or more cable or conduit receiving passages. Each of the cable or conduit receiving passages may have one of a predefined selection of passage sizes that may correspond to a size of standard, commercially available electrical cables or conduits, including but not limited to battery cables, other electrical cables, and hydraulic fluid conduits. As a result, the concepts of the disclosure enable a user to more efficiently and effectively assemble and install the clamps 102, 150 and the cable or conduits 144A, 144B, while also enabling stacking of clamps 102, 150 in a space saving arrangement.

Figure 6:
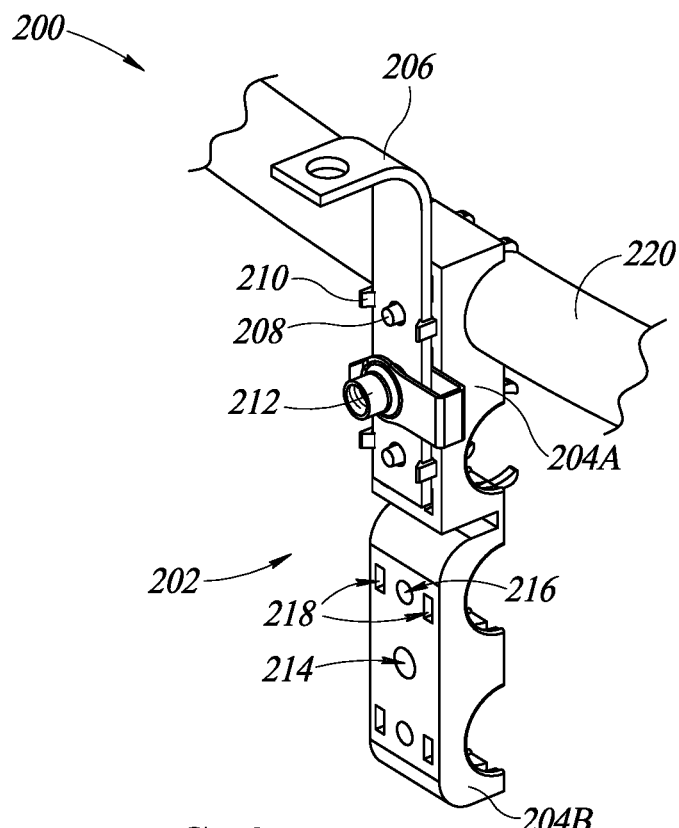
FIG. 6 and FIG. 7 are rear and front perspective views, respectively, of an embodiment of a clamp system according to the present disclosure.
Figure 7:
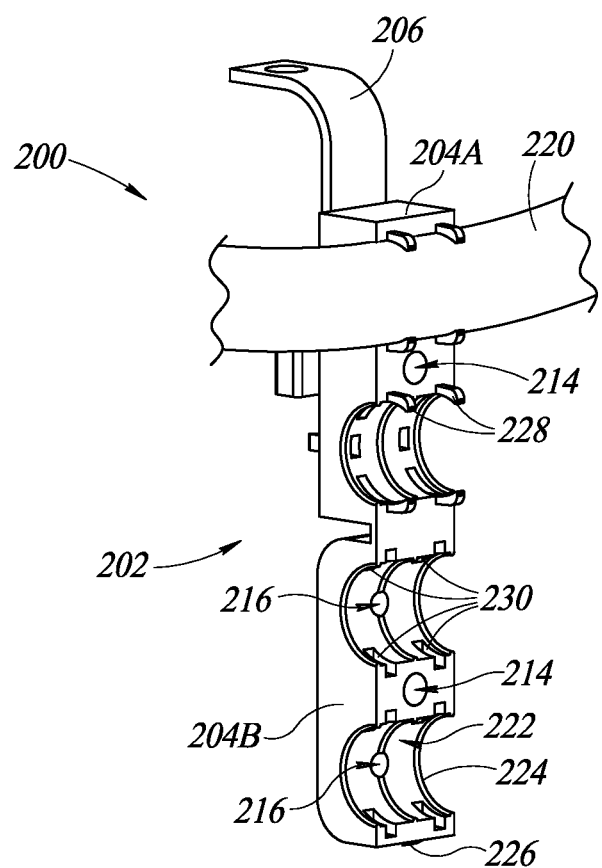

FIG. 6 and FIG. 7 illustrate another embodiment of a clamp system 200 according to the present disclosure. In particular, FIG. 6 is a rear perspective view of the system 200 and FIG. 7 is a front perspective view of the system 200 to illustrate differences between the system 200 and the system 100 described with reference to FIGS. 1 through 5.

Beginning with FIG. 6, the system 200 includes a clamp 202, which may be a clamshell or other type of clamp, with a first body 204A coupleable to a second body 204B. In an embodiment, the first body 204A is rotatably coupled to the second body 204B by a hinge or a strip of flexible and elastic material. The clamp 202 is coupleable to a bracket 206 that is structured to be coupled to a vehicle. In an embodiment, the clamp 202 includes fastening clips 208 extending from the first body 204A that are received in corresponding holes in the bracket 206 to assist with coupling the clamp 202 to the bracket 206, and also to prevent rotation of the clamp 202 relative to the bracket 206. Further, the first body 204A includes latching arms 210 provided in a form factor of protrusions extending from a rear surface of the first body 204A and with flanges perpendicular to the protrusions for interfacing with, and engaging, the bracket 206. In particular, the latching arms 210 may be elastic to enable a snap fit connection between the first body 204A and the bracket 206. A spring clip nut 212 is coupled to the bracket 206 for receiving a fastener to couple the clamp 202 to the bracket 206.

The second body 204B includes a central bore 214 through the second body 204B as well as one or more holes 216 in a front or outer surface of the second body 204B. The one or more holes 216 may include two holes 216 on opposite sides of the central bore 214 (i.e., above and below the central bore 214 or to the left and the right of the central bore 214 depending on orientation) that are structured to receive the fastening clips 208 of an additional clamp similar to the clamp 202 in a stacking arrangement. Further, the second body 104B includes at least one latching aperture 218 structured to interface with, and engage, the latching arms 210 of a second clamp in the stacked arrangement. Thus, an additional clamp may be coupled to the clamp 202 via fastening clips 208 and latching arms 210 of the additional clamp received in, and interfacing with, the holes 216 and latching aperture 218 of the clamp 202. As will be described in more detail below, the clamp is structured to receive and retain one or more cables or conduits 220.

Turning to FIG. 7, each of the first and second bodies 204A, 204B include at least one channel 222 having a size and a shape to receive one or more cables or conduits 220. The channels 222 of the bodies 204A, 204B cooperate to define cables or conduit retention openings through the clamp 202 when the first body 204A is coupled to the second body 204B, as described elsewhere. Each of the first body 204A, 204B may also include ridges 224 extending from the respective body 204A, 204B into the channels 222. In an embodiment, the channels 222 have a semicircular shape with an arc angle being approximately 180 degrees, and the ridges 224 extend across an entirety of the channels 222 with a similar arc angle. Further, each body 204A, 204B may include only one, two, three, or more ridges 224 that assist with engaging and securing the cables or conduit 220. The second body 204B may also include a grasping element 226 in a form factor of a protrusion or raised surface on the second body 204B to assist with manipulating the second body 204B with respect to the first body 204A, such as when uncoupling the second body 204B from the first body 204A.

The first body 204A also includes retention clips 228, but the retention clips 228 are different in form and at least partially different in function than the retention clips 118 of the system 100. As shown in FIG. 7, the retention clips of the clamp 202 are provided in a form factor of individual curved extensions along the edges of the channels 222 rather than a single continuous curved protrusion along the edge of the cables or conduit receiving channel 108 as in the system 100 (FIG. 1). In an embodiment, the clamp 202 may include two retention clips 228 on each opposite side of the channel 222 in the first body 204A with the clips 228 having a selected spacing on each side of the channel 222. For example, the clips 228 may be positioned at outer edges of the channel 222, or may be located proximate a center of the channel 222 among other locations. Further, the clamp 202 may include only one, or three, four, five or more individual and spaced retention clips 228 on each side of each channel 222 in the first body 204A and/or the second body 204B. The retention clips 228 increase the effective arc angle of the channel 222 beyond 180 degrees and engage and retain the cables or conduit 220 without external assistance in a similar manner to retention clips 118 (FIG. 1). However, the clips 228 also have additional functionality in the clamp 202. In particular, the clips 228 may interface with, and be received in, corresponding clip openings 230 at the edge of the channel 222 in the second body 204B and/or in sidewalls defining the channel 222 in the second body 204B. When the second body 204B is rotated to engage the first body 204A, the retention clips 228 engage the clip openings 230 in the second body 204B to assist with coupling the second body 204B to the first body 204A in a snap fit connection. The first and second bodies 204A, 204B may each also include the bore 214 for receiving a fastener to couple the clamp 202 to the bracket 206, as shown in FIG. 7.

Thus, FIG. 6 and FIG. 7 provide an additional non-limiting example of an alternative form factor of a clamp that achieves the benefits and advantages described herein. As noted above, other form factors are contemplated herein. In sum, the concepts of the disclosure provide clamps that can be efficiently manipulated and installed by initially retaining cables or conduits and the clamp itself without assistance from the operator. Further, the clamps can be stacked in front of and behind each other to save space and increase cables or conduit organization, while also being able to carry additional clamps outside of the clamp in some embodiments.

In the foregoing description, certain specific details are set forth in order to provide a thorough understanding of the technology. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Also, as used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The use of ordinals such as first, second and third does not necessarily imply a ranked sense of order, but rather may only distinguish between multiple instances of an act or structure.

Terms of geometric alignment may be used herein. Any components of the embodiments that are illustrated, described, or claimed herein as being aligned, arranged in the same direction, parallel, or having other similar geometric relationships with respect to one another have such relationships in the illustrated, described, or claimed embodiments. In alternative embodiments, however, such components can have any of the other similar geometric properties described herein indicating alignment with respect to one another. Any components of the embodiments that are illustrated, described, or claimed herein as being not aligned, arranged in different directions, not parallel, perpendicular, transverse, or having other similar geometric relationships with respect to one another, have such relationships in the illustrated, described, or claimed embodiments. In alternative embodiments, however, such components can have any of the other similar geometric properties described herein indicating non-alignment with respect to one another.

Various examples of suitable dimensions of components and other numerical values may be provided herein. In the illustrated, described, and claimed embodiments, such dimensions are accurate to within standard manufacturing tolerances unless stated otherwise. Such dimensions are examples, however, and can be modified to produce variations of the components and systems described herein. In various alternative embodiments, such dimensions and any other specific numerical values provided herein can be approximations wherein the actual numerical values can vary by up to 1, 2, 5, 10, 15 or more percent from the stated, approximate dimensions or other numerical values.

Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A cable or conduit retention system, comprising:
   a clamshell clamp including a first body pivotably coupled to a second body, the first body and the second body selectively coupleable together in a face-to-face arrangement to define one or more cable or conduit receiving passages, the first body including one or more cable or conduit receiving channels and a respective pair of retention clips on opposite sides of each of the one or more cable or conduit receiving channels in the first body, each pair of retention clips being structured to retain a respective cable or conduit in the corresponding cable or conduit receiving channel prior to the second body being coupled to the first body in the face-to-face arrangement to secure the cable or conduit in the clamshell clamp,
   wherein the first body of the clamshell clamp includes an alignment recess, and a pair of fasteners extending from the first body on opposite sides of the alignment recess, and
   wherein the second body of the clamshell clamp includes an alignment protrusion, and a pair of fastener holes extending through the second body on opposite sides of the protrusion.

2. The cable or conduit retention system of claim 1, wherein each pair of retention clips of the first body extend from opposing peripheral edges about a respective one of the one or more cable or conduit receiving channels in the first body.

3. The cable or conduit retention system of claim 2, wherein each of the retention clips extend around a corresponding one of the cable or conduit receiving channels at an arc angle between and excluding 0 degrees and 20 degrees.

4. The cable or conduit retention system of claim 1, further comprising:
   a mounting support structured to be coupled to a vehicle, the mounting support including fastening holes structured to receive the pair of fasteners extending from the first body for securing the clamshell clamp to the mounting structure; and
   a spring clip nut on the mounting support, and
   wherein the alignment recess of the first body is structured to accommodate the spring clip nut and enable mounting surfaces on opposing sides of the alignment recess to abut the mounting support.

5. The cable or conduit retention system of claim 4, wherein the clamshell clamp includes an axial bore through the first body and through the second body, the cable or conduit retention system further comprising:
   a fastener insertable through the axial bore of the clamshell clamp to engage the spring clip nut on the mounting support to securely fasten the clamshell clamp to the vehicle.

6. The cable or conduit retention system of claim 1, further comprising:
   a supplemental clamshell clamp including a first body pivotably coupled to a second body and selectively coupleable to the second body in a face-to-face arrangement, the supplemental clamshell clamp including:
      an alignment recess in the first body;
      a pair of fasteners extending from the first body on opposite sides of the alignment recess;
      an alignment protrusion extending from the second body; and a pair of fastening holes through the second body on opposite sides of the alignment protrusion.

7. The cable or conduit retention system of claim 6, wherein the alignment recess in the first body of the supplemental clamshell clamp is structured to receive the alignment protrusion of the second body of the clamshell clamp in a stacking arrangement and the pair of fastening holes of the second body of the clamshell clamp are structured to receive the pair of integral fasteners of the first body of the supplemental clamshell clamp to secure the further clamshell clamp to the clamshell clamp in a stacked arrangement.

8. A system, comprising:
a clamp including a first body removably coupleable to a second body in a face-to-face arrangement;
a receiving passage in the clamp defined at least in part by a receiving channel in the first body;
at least one retention clip extending from the first body at an edge of the receiving channel in the first body, the at least one retention clip extending away from a mating surface of the first body beyond a midplane of the receiving channel to retain a cable or conduit in the receiving channel prior to the second body being coupled to the first body in the face-to-face arrangement to secure the cable or conduit in the receiving passage; and
a pair of fasteners extending from a coupling surface of the first body, each fastener including an extension and a flange configured to engage a mounting support to couple the clamp to the mounting support.

9. The system of claim 8, wherein the at least one retention clip includes a pair of retention clips extending from the first body on opposing edges of the receiving channel and along a majority of the opposing edges of the receiving channel, and
wherein the receiving channel in the first body defines a first arc angle about the receiving passage and the pair of retention clips collectively define a second arc angle about the cable receiving passage, and a sum of the first arc angle and the second arc angle is greater than 180 degrees, and
wherein each of the pair of retention clips has a continuous arc angle with the receiving channel.

10. The system of claim 9, wherein the pair of retention clips are resilient and are configured to flex away from each other during insertion of the cable or conduit into the receiving channel and to return to a neutral position to assist in retaining the cable or conduit in the receiving channel, and
wherein an outer one of the pair of retention clips extends across the mating surface of the first body to an outer surface of the first body, and
wherein an inner one of the outer pair of retention clips has a thickness that is less than a thickness of the outer one of the pair of retention clips.

11. The system of claim 8, wherein the second body further includes an opposing receiving channel, and
wherein the receiving passage is collectively defined by the receiving channel in the first body and the opposing receiving channel in the second body when the first body is coupled to the second body in the face-to-face arrangement.

12. The system of claim 11, wherein the second body includes a depression at an edge of the opposing receiving channel of the second body, the depression in the second body structured to receive the at least one retention clip when the first body is coupled to the second body in the face-to-face arrangement.

13. The system of claim 8, wherein the clamp in one of a plurality of clamps that are coupleable together in a stacked configuration.

14. The system of claim 13, wherein each clamp is identical to each other.

15. The system of claim 13, wherein each clamp comprises a similar form factor and includes one or more receiving passages having a size corresponding to standard electrical cables or standard fluid conduits.

16. A system, comprising:
a clamp including a first body removably coupleable to a second body in a face-to-face arrangement;
a receiving passage in the clamp defined at least in part by a receiving channel in the first body;
at least one retention clip extending from the first body at an edge of the receiving channel in the first body, the at least one retention clip extending away from a mating surface of the first body beyond a midplane of the receiving channel to retain a cable or conduit in the receiving channel prior to the second body being coupled to the first body in the face-to-face arrangement to secure the cable or conduit in the receiving passage;
a mounting support structured to be coupled to a vehicle; and
a spring clip nut on the mounting support, the first body including an alignment recess structured to receive the spring clip nut when the first body is adjacent to the mounting support.

17. The system of claim 16, wherein the first body of the clamp includes a fastener extending from the first body, the second body includes an alignment protrusion extending from the second body and a hole through the second body, the system further comprising:
a supplemental clamp including:
a first body;
a second body removably coupleable to the first body in a face-to-face arrangement;
an alignment recess in the first body; and
a fastener extending from the first body.

18. The system of claim 17, wherein the alignment recess in the first body of the supplemental clamp is structured to receive the alignment protrusion of the second body of the clamp in a stacking arrangement and the hole through the second body of the clamp is structured to receive the fastener of the first body of the supplemental clamp to couple the second clamp to the first clamp.

19. A clamp system, comprising:
a clamp, including:
a first clamp portion having a cable or conduit receiving channel and latching arms that extend away from a mounting surface of the first clamp portion and are configured to engage a bracket to couple the clamp to the bracket;
a second clamp portion selectively coupleable to the first clamp portion in a face-to-face arrangement; and
a cable or conduit receiving passage defined at least in part by the cable or conduit receiving channel in the first clamp portion and the second clamp portion when in the face-to-face arrangement, the first clamp portion structured to retain a cable or conduit in the cable or conduit receiving channel prior to the second clamp portion being coupled to the first clamp portion in the face-to-face arrangement to secure the first cable or conduit in the cable or conduit receiving passage.

20. The clamp system of claim 19, wherein the first clamp portion includes a pair of retention clips proximate the cable or conduit receiving channel in the first clamp portion, a combined arc angle of the pair of retention clips and the cable or conduit receiving channel in the first clamp portion being greater than 180 degrees to retain the cable or conduit in the cable or conduit receiving channel prior to the second body being coupled to the first body in the face-to-face arrangement, and wherein the pair of retention clips have a continuous arc angle with the cable or conduit receiving channel.

21. The clamp system of claim 19, further comprising:

a supplemental clamp structured to be coupled to the first clamp in a stacked configuration and including a first clamp portion selectively coupleable to a second clamp portion in a face-to-face arrangement, the supplemental clamp further including:

an alignment recess in the first clamp portion; and a fastener extending from the first clamp portion.

22. The clamp system of claim 21, wherein the alignment recess of the first clamp portion of the supplemental clamp is structured to receive an alignment protrusion of the second clamp portion of the clamp and the fastening hole of the second clamp portion of the clamp is structured to receive the fastener of the first clamp portion of the supplemental clamp to couple the supplemental clamp to the clamp in the stacked configuration.

23. The clamp system of claim 19, wherein the clamp includes a fastener extending from a lower mating surface of the first clamp portion, and the clamp system further comprising:

a mounting support structured to be coupled to a vehicle, the mounting support including at least one hole structured to receive the fastener of the first clamp portion of the clamp to couple the clamp to the vehicle.

24. The clamp system of claim 19, wherein the first clamp portion includes a plurality of cable or conduit receiving channels and at least one respective retention clip proximate each of the plurality of cable or conduit receiving channels to retain a plurality of cables or conduits within the first clamp portion prior to the second clamp portion being coupled to the first clamp portion in the face-to-face arrangement.

25. The clamp system of claim 19, wherein the latching arms each include an extension and a flange perpendicular to the extension to enable a snap fit connection between the latching arms and the bracket, and wherein the latching arms are a pair of latching arms positioned on opposite sides of an alignment protrusion that extends away from the mounting surface of the first clamp portion.

\* \* \* \* \*